United States Patent
McBeath

(10) Patent No.: US 10,666,595 B2
(45) Date of Patent: May 26, 2020

(54) METHOD AND SYSTEM FOR INTEGRATION OF SHARED CALENDARS WITH MESSAGING APPLICATIONS

(71) Applicant: BlackBerry Limited, Waterloo (CA)

(72) Inventor: Sean Michael McBeath, Keller, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 16/042,763

(22) Filed: Jul. 23, 2018

(65) Prior Publication Data

US 2020/0028812 A1  Jan. 23, 2020

(51) Int. Cl.
*H04L 12/58* (2006.01)
*G06Q 10/10* (2012.01)
*H04M 1/725* (2006.01)

(52) U.S. Cl.
CPC ......... *H04L 51/18* (2013.01); *G06Q 10/1093* (2013.01); *H04M 1/72566* (2013.01)

(58) Field of Classification Search
CPC ..... H04L 67/306; H04L 65/403; H04L 51/16; H04L 51/32; H04L 63/104; G06F 17/30752; G06F 15/17306; G06F 17/30867; G06F 17/3089; H04W 4/08; H04W 8/186; H04W 88/02; G06Q 50/01; G06Q 10/06311; H04N 21/4788; H04M 1/72552; H04M 1/72566
See application file for complete search history.

(56) References Cited

U.S. PATENT DOCUMENTS

| | | | |
|---|---|---|---|
| 2006/0123008 A1* | 6/2006 | Stillion | G06Q 10/00 |
| 2011/0071878 A1* | 3/2011 | Gingras | G06Q 10/109 |
| | | | 705/7.18 |
| 2011/0252351 A1 | 10/2011 | Sikora et al. | |
| 2013/0007648 A1 | 1/2013 | Gamon et al. | |
| 2013/0239016 A1 | 9/2013 | Adams et al. | |
| 2014/0257902 A1 | 9/2014 | Moore et al. | |
| 2014/0288990 A1 | 9/2014 | Moore et al. | |
| 2017/0285897 A1 | 10/2017 | Liensberger et al. | |

OTHER PUBLICATIONS

Wikipedia; "Natural Language Processing," https://en.wikipedia.org/w/index.php? title=Natural_language_processing&oldid=850284867; Jul. 14, 2018; 8 pages.
European Extended Search Report; Application No. 19186502.1; dated Nov. 28, 2019; 6 pages.

* cited by examiner

*Primary Examiner* — Nizar N Sivji
(74) *Attorney, Agent, or Firm* — Conley Rose, P.C.; J. Robert Brown, Jr.; Gayatry S. Nair

(57) ABSTRACT

A method at an electronic device, the method including receiving a message at the electronic device; processing the message to find a potential calendar event; comparing correspondents of the message with membership in at least one shared calendar accessible by the electronic device; selecting a shared calendar based on the comparing; and populating a calendar input field with an identifier of the selected calendar.

17 Claims, 14 Drawing Sheets

METHOD AND SYSTEM FOR INTEGRATION OF SHARED CALENDARS WITH MESSAGING APPLICATIONS

FIELD OF THE DISCLOSURE

The present disclosure relates to calendar applications and messaging applications, and in particular relates to the integration of calendar and messaging applications.

BACKGROUND

Modern electronic devices support shared calendars, where a shared calendar is one in which two or more people have access to the calendar to view, add, edit and/or delete entries. Such shared calendar typically exists in a calendar application separately from a default calendar or other calendar for a user, which may not be shared. In other words, non-shared events, appointments or reminders can be placed in a first calendar, while shared events, appointments or reminders can be placed in a calendar shared by the two or more users.

Further, modern electronic devices may have messaging applications that can utilize natural language processing to recognize times, days, and dates in messages, where the times, days, and dates can be turned into calendar entries. For example, a user may receive a text message saying: "Do you want to have lunch on Friday?". Natural language processing may parse this and either automatically create an event for Friday at lunch or prompt a user on whether to create such event.

However, in the electronic devices, the messaging applications and calendar applications are not well integrated. This can lead to a poor user experience.

BRIEF DESCRIPTION OF THE DRAWINGS

The present disclosure will be better understood with reference to the drawings, in which.

DETAILED DESCRIPTION OF THE DRAWINGS

Figure 1:
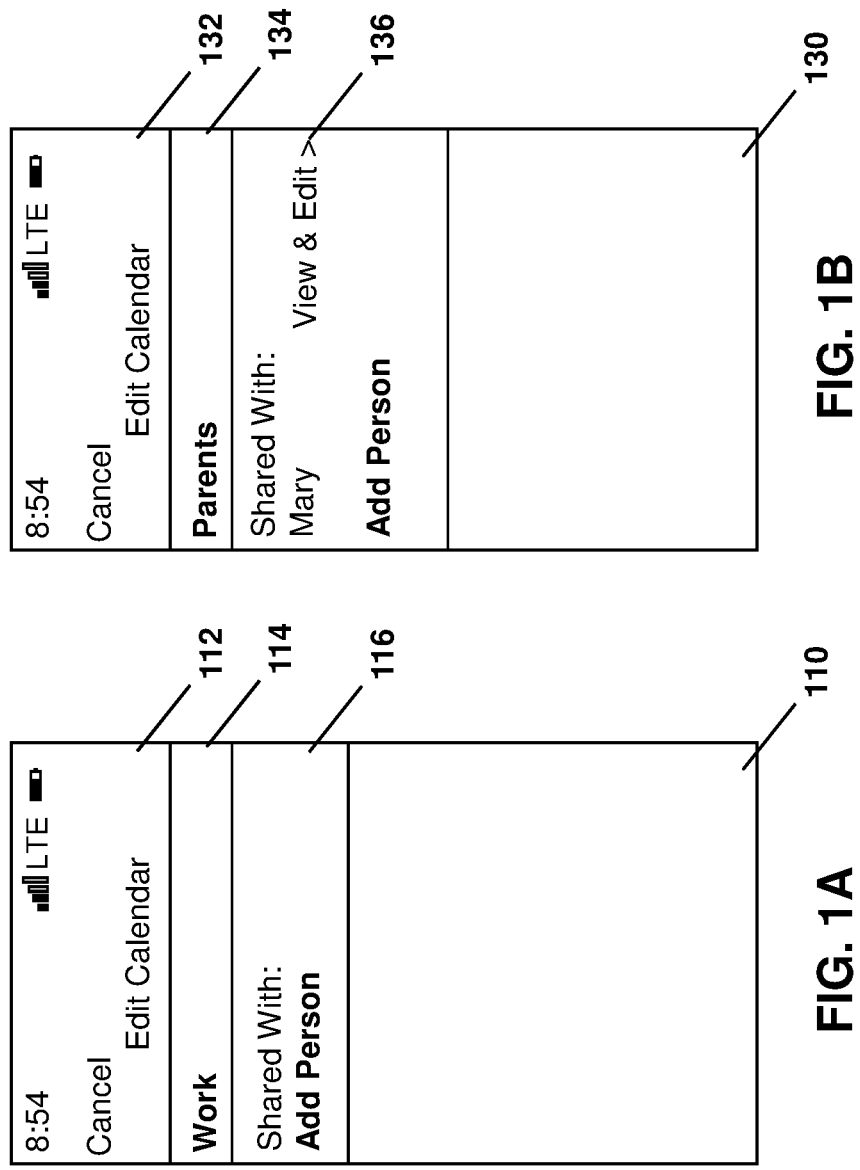
FIG. 1A is a block diagram showing an example window used for configuring a calendar.
FIG. 1B is a block diagram showing an example window used for configuring a calendar where the calendar is shared.

The present disclosure provides a method at an electronic device, the method comprising: receiving a message at the electronic device; processing the message to find a potential calendar event; comparing correspondents of the message with membership in at least one shared calendar accessible by the electronic device; selecting a shared calendar based on the comparing; and populating a calendar input field with an identifier of the selected calendar.

The present disclosure further provides an electronic device comprising: a processor; and a communications subsystem wherein the electronic device is configured to: receive a message; process the message to find a potential calendar event; compare correspondents of the message with membership in at least one shared calendar accessible by the electronic device; select a shared calendar based on the comparing; and populate a calendar input field with an identifier of the selected calendar.

The present disclosure further provides a computer readable medium for storing instruction code which, when executed by a processor of an electronic device cause the electronic device to: receive a message; process the message to find a potential calendar event; compare correspondents of the message with membership in at least one shared calendar accessible by the electronic device; select a shared calendar based on the comparing; and populate a calendar input field with an identifier of the selected calendar.

Modern electronic devices support shared calendars. Electronic devices, as used herein, can be any wired or wireless device, including, but not limited to, mobile devices such as user equipments, smart phones, data enabled mobile devices, paging devices, data enabled cellular telephones, laptops, Internet of things devices, or other computing device, or may be any fixed devices including computing devices, servers, Internet of things devices, among other options.

An electronic device may have multiple applications that are used for user convenience. These include calendar applications for helping organize a user, messaging applications for the user to communicate with others, among other options.

Modern messaging applications may utilize natural language processing to recognize times, days, and dates in messages, which can then be turned into calendar entries. However, as provided below, such solutions are not well integrated and the user experience is therefore not optimized.

In the embodiments below, various solutions to integrating messaging and calendar applications are provided. These embodiments include the integration of the messaging application into the selection of a particular calendar in which to enter an event, the cancelling of events in calendars based on messaging, the propagation of a choice of alerts to similar messaging, and the resolution of ambiguous messaging. In some cases, these solutions can be performed individually. In other cases, the solutions can be combined together.

Calendar Selection

In one embodiment, the calendar and messaging applications may be integrated to allow for the choice of calendar to be made automatically or for a user to be prompted with a calendar determined based on messaging correspondents in which to enter an event. For example, reference is now made to FIG. 1A, which shows a user interface of an electronic device. The user interface of FIGS. 1A and 1B is however merely provided to illustrate the embodiments herein, and is not limiting. Other types of user interfaces utilizing messaging or calendar applications would be apparent to those skilled in the art.

In the embodiment of FIG. 1A, window 110 may be used to configure a calendar accessible by the electronic device. The configuration is done through editing the calendar, shown in area 112. Further, area 114 shows which calendar is being edited. In the case of FIG. 1A, this it is a calendar entitled "Work".

Area 116 shows which users the calendar is shared with. In the case of FIG. 1A, there is no other user defined in area 116, and therefore the calendar is not shared with anyone.

Conversely, in FIG. 1B, a window 130 includes an editing area 132. In the case of FIG. 1B, the calendar is entitled "Parents", as shown in area 134.

Furthermore, the calendar is shared one other user, namely Mary, as shown in area 136. The calendar can be shared with more than one other user. Different users may utilize different types of electronic devices to access the calendar.

Figure 2:
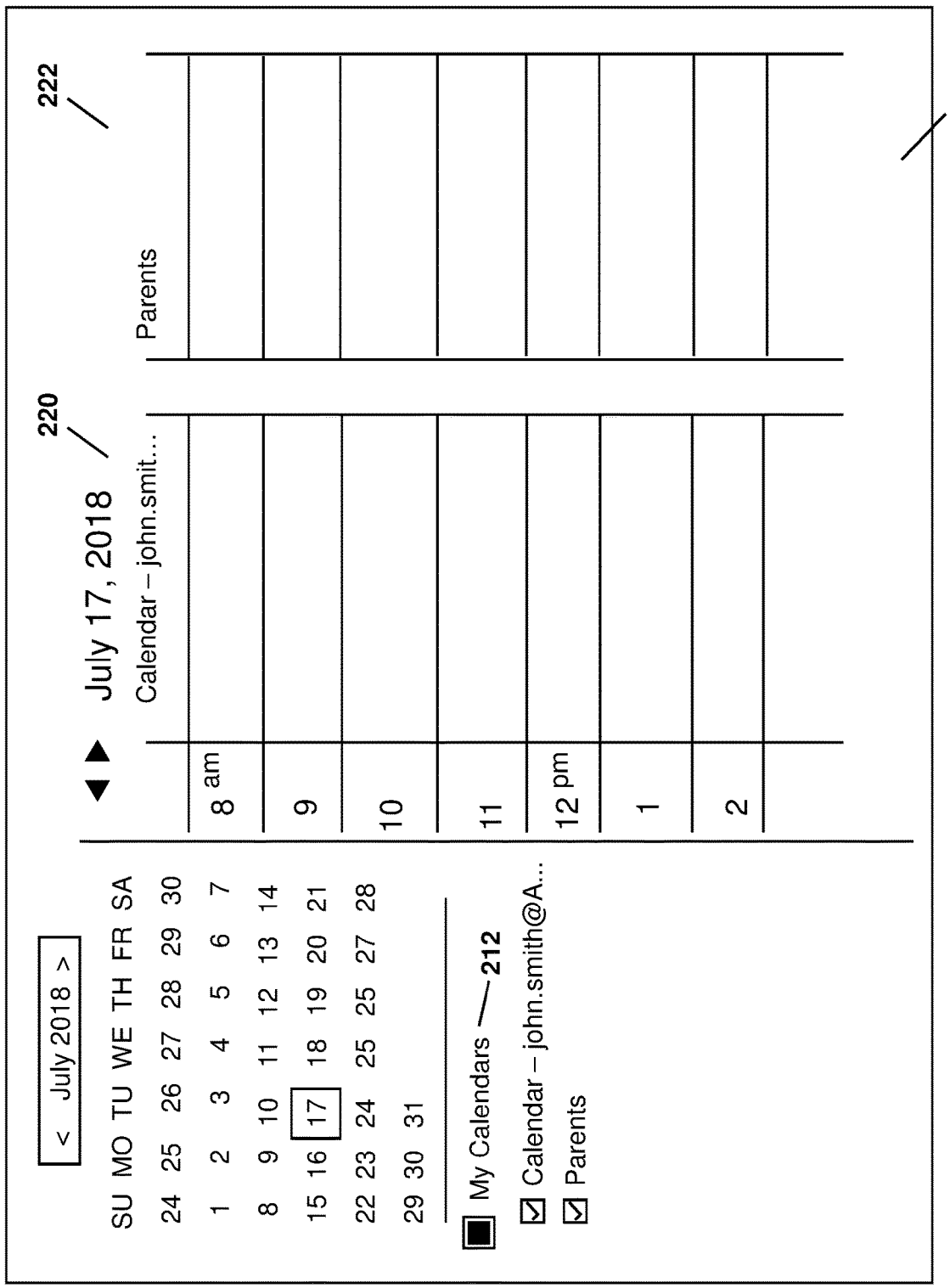
FIG. 2 is a block diagram showing an example window showing a plurality of calendars.

In other cases, a calendar application may be provided as part of a desktop or laptop environment. For example, reference is now made to FIG. 2. In the embodiment of FIG. 2, a calendar 210 is shown, where two calendars are displayed. In particular, a first calendar is associated with a user and a second calendar is associated with "Parents". These calendars are shown with the selection bar 212 and in the example of FIG. 2, a single day's activities are shown in areas 220 and 222, one for each calendar.

The Parents calendar may, in one case, be a shared calendar with other users, while the personal calendar may be a default calendar and may be unshared.

In the examples of FIGS. 1A, 1B and FIG. 2 above, any of the calendars may be set to be a user's default calendar. This may be done, for example, within the calendar applications or as part of the settings associated with the calendar application. Typically, in current systems, one calendar may be set as the default calendar and the remaining calendars are considered non-default calendars.

While the availability of shared calendars is possible, messaging applications are currently not well integrated to use such shared calendars. In particular, reference is now made to FIGS. 3A, 3B and 3C.

Figure 3:
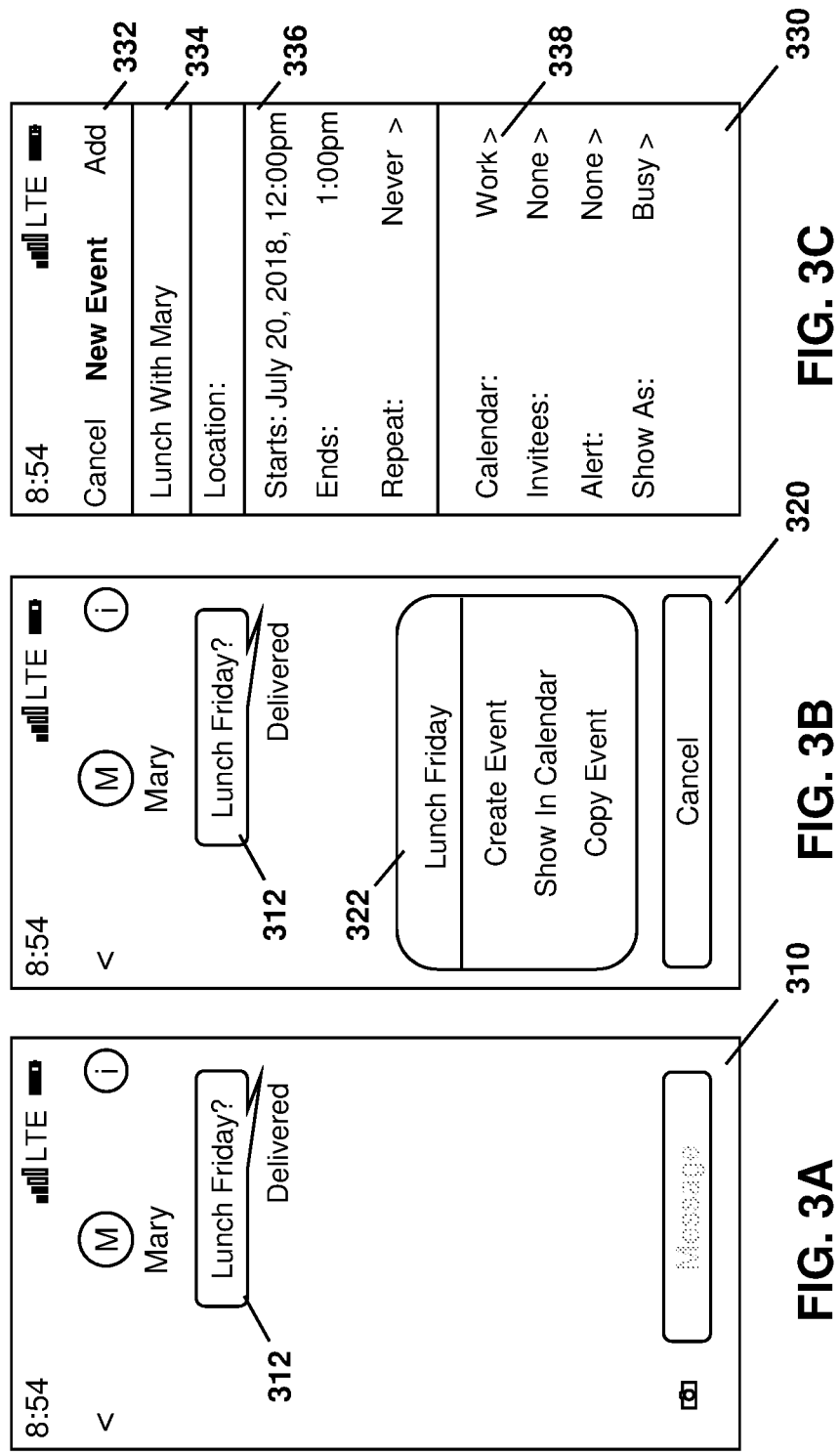
FIG. 3A is a block diagram showing an example window of a messaging application.
FIG. 3B is a block diagram showing an example window used for a messaging application in which potential events have been detected and in which a user is prompted to perform an action.
FIG. 3C is a block diagram showing an example window used for configuring a calendar event based on the event detected in FIG. 3B.

As seen in the embodiment of FIG. 3A, a messaging application is provided on a window 310. In this case, the messaging application is a text messaging application. However, in other embodiments the messaging application may be any application in which two users may correspond, including but not limited to instant messaging applications, email applications, social media platforms, short message service (SMS) or multimedia message service (MMS), among other options.

In the embodiment of FIG. 3A, a user named Mary is interacting with the user of the electronic device, named Mike. In this case, Mary sends Mike a message 312 asking whether Mike would like to have lunch on Friday. In particular, the message 312 reads "Lunch Friday?". In this case, the message is with two total participants. In other embodiments, group messaging is used where there are more than two total participants.

The electronic device that Mike is using may have natural language processing, which may detect the potential event in the request for a lunch and may create a menu 322 on window 320, as shown in FIG. 3B. In particular, the menu 322 may indicate the words that were found, along with options such as "Create Event", "Show in Calendar", or "Copy Event". Such menu options are however not limiting and in other embodiments or implementations, other menu options may be presented to a user. However, typically one of the menu options will be used to create a calendar event based on the natural language processing algorithm finding a potential event in the messaging.

If the user selects the create event option, then the configuration window 330 of FIG. 3C may be shown, which allows the user to create a calendar entry by configuring various input fields of the calendar entry such as event description, location, and the specific calendar stored in calendar field 338 for the event.

In particular, as seen in area 332, the configuration window 330 is for the creation of a new event. The event is identified in area 334 as "Lunch with Mary". Further, in area 336, a date and time can be configured.

However, as seen in calendar field 338, the default calendar is selected by the calendar application or messaging application in which to create in the event. In this case, the default calendar is the work calendar and therefore the event will be populated into the user's work calendar.

Therefore, in accordance with one embodiment of the present disclosure, calendar selection may be made based on the participants in a message thread. In particular, if a device detects a potential calendar event using natural language processing in a messaging thread, it may compare the messaging correspondents with members of the various shared calendars. If there is a single match, the calendar in the calendar field of the new event is initially set to the calendar whose membership matches the messaging correspondents.

If multiple matches for calendars exist, then the device may prompt the user to select one of the matching calendars, may select one of the matching calendars by default, or may sort a list of calendars (e.g. in a drop down list the user selects after touching the area near calendar field 338) based with matching calendars shown before non-matching calendars.

Figure 4:
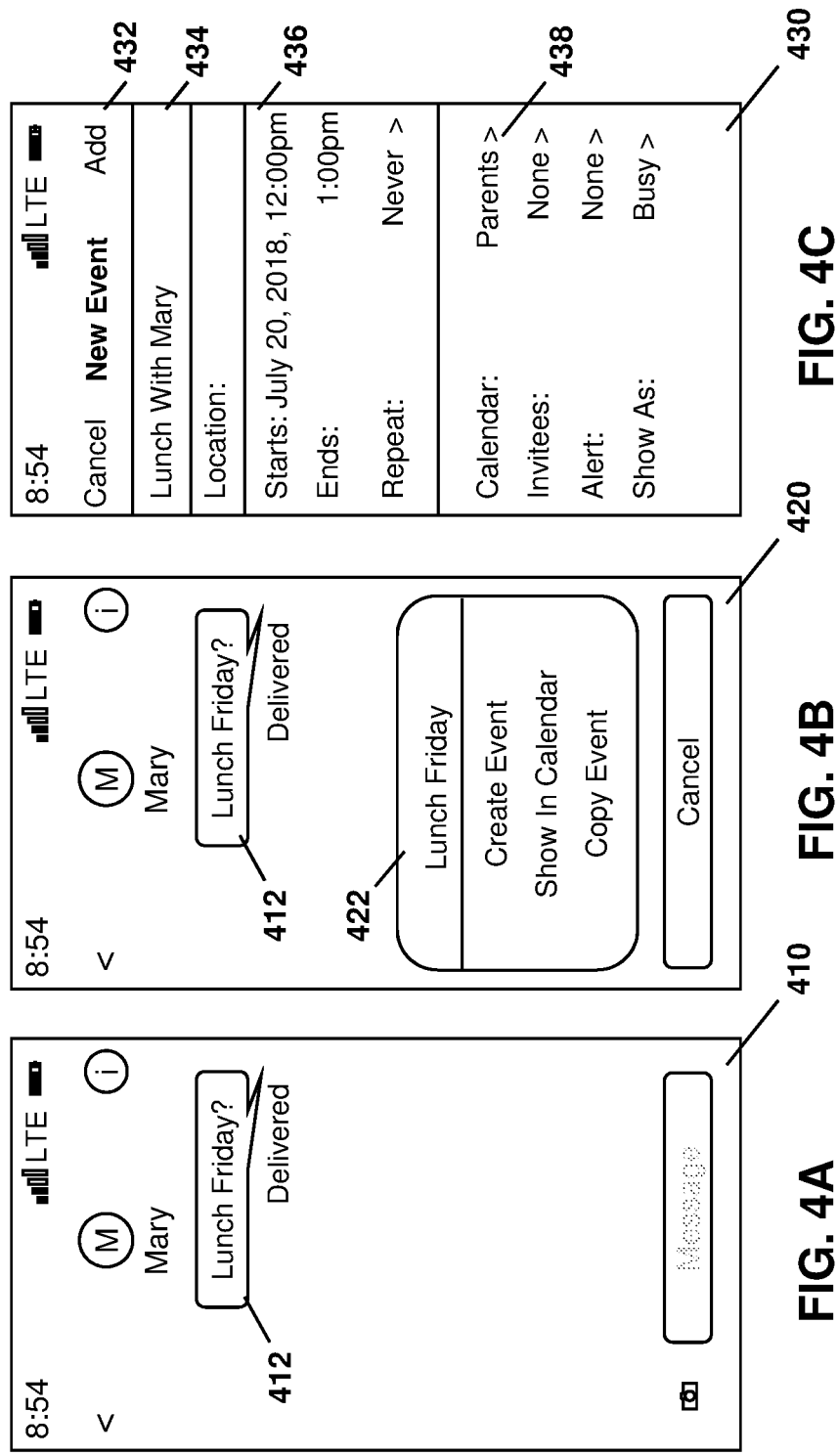
FIG. 4A is a block diagram showing an example window of a messaging application.
FIG. 4B is a block diagram showing an example window used for a messaging application in which potential events have been detected and in which a user is prompted to perform an action.
FIG. 4C is a block diagram showing an example window used for configuring a calendar event based on the event detected in FIG. 4B and in which a shared calendar is selected as the calendar to populate with the event.

For example, reference is made to FIG. 4A. In the embodiment of FIG. 4A, Mary sends Mike a message asking whether Mike is interested in lunch on Friday.

Thus, as seen in FIG. 4A, window 410 includes the message 412 from Mary asking for lunch.

Based on natural language processing, in FIG. 4B a menu 422 is launched. In particular, menu 422 provides the phrase that the natural language processing algorithm detected that may lead to a calendar event. Further, various options such as create event, showing calendar, copy event may be provided.

If a user selects "create event", then window 430 of FIG. 4C may appear on a user's electronic device. As seen in FIG. 4C, area 432 shows that a new event is being created and a proposed title is shown in area 434.

Further, the start and end times, along with the dates are shown in area 436.

As seen by calendar field 438, the initial calendar is populated with an identifier for the "Parents" calendar since both Mike and Mary are part of the shared calendar parents. This may be done, for example, utilizing the calendar of FIG. 1B.

The populating of calendar field 438 may be done based on membership in shared calendars and the participants identified in messaging. For example, reference is now made to FIG. 5.

Figure 5:
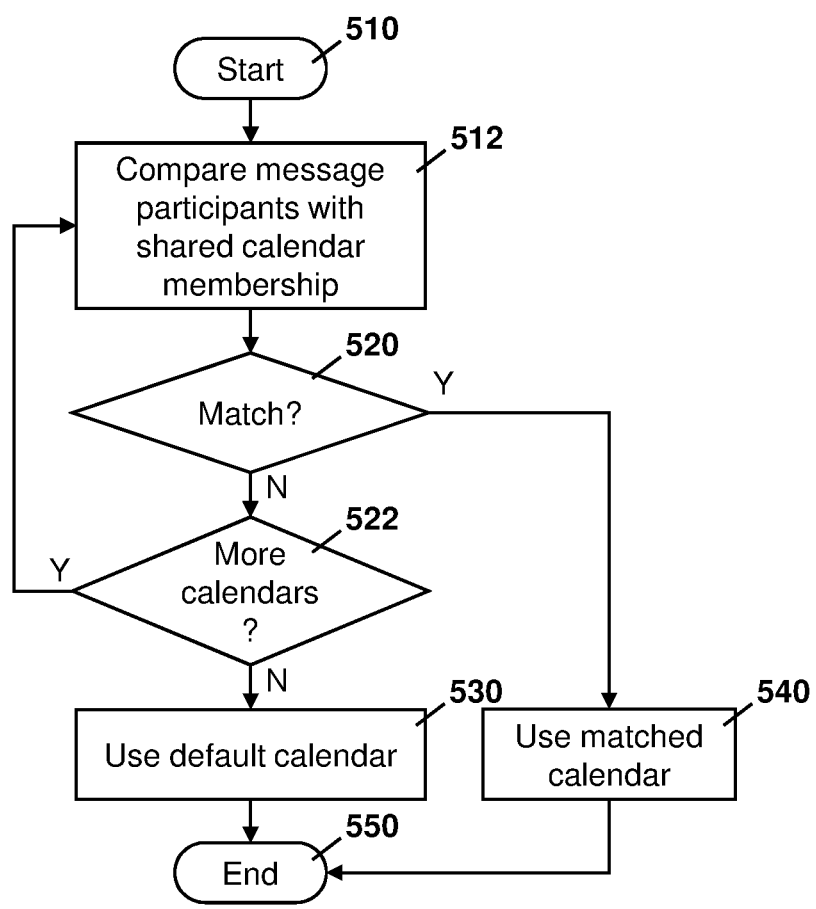
FIG. 5 is a process diagram showing a process for selecting one or more potential calendars to put a new calendar event into.

The process of FIG. 5 starts at block 510 when a messaging application detects a potential calendar event, for example through natural language processing. The process then proceeds to block 512 in which the electronic device may compare message participants with shared calendar membership. In particular, the process of block 512 may start with a default calendar and check whether or not the message participants are the same as those in that calendar.

The process then proceeds to block 520 in which a check is made to determine whether a match was found between the calendar membership and the message participants.

If not, the process proceeds to block 522 in which a check is made to determine whether more calendars can be compared. If yes, the process may proceed back to block 512 in which a new calendar is selected and a new comparison is made.

At block 522, if there are no further calendars to compare, and a match has not been found, then the process may proceed to block 530 in which a default calendar is used.

Conversely, if a match is found at block 520, then the process proceeds to block 540 in which the matched calendar is used and provided, for example as calendar field 438 in FIG. 4C.

Alternatively, even if a match is found at block 520, the process may still proceed to block 522 and continued to loop until all the calendars have been processed. In this case, a list of matching calendars may be compiled which may be presented to a user (e.g. via selection of a drop-down list by touching the calendar field 438). If a list is presented to the user, the list of matching calendars may be presented first, followed by non-matching calendars. This would provide the ability to use a different calendar than the first found calendar.

From blocks 530 and 540 the process may proceed to block 550 and end.

The check for the match at block 520 may be done in various ways. In one embodiment, only an exact match will be valid at block 520. Thus, if membership in a shared calendar only has the people participating in the messaging, only then will there be a match found at block 520. For example, using the calendar of FIG. 1B, if the messaging is between Mike and Mary and the calendar has Mike and Mary as the shared members, then a match is found at block 520.

However, in some cases, the shared calendar membership may include Mike and Mary, but may include other members as well. For example, a book club calendar may include Mike and Mary but may include several other users as well. In this case, if no better calendar is found then the selection may be made for the shared calendar with the membership that includes Mike and Mary but includes other participants as well. In this case, the calendar with the additional membership may be selected by default. In other cases, the user may be prompted to select the calendar and acknowledge that the other members of the calendar will also see the event. In other cases, the matching or partial matching can may be disabled based on user settings and thus only if an exact match is found at block 520 will the matched calendar be used at block 540.

Similarly, if the messaging correspondents include members of that are not part of a shared calendar, but the majority of the participants are part of the shared calendar, in some cases the check at block 520 may find a match with the calendar containing a majority of the participants in the messaging. Again, the partial matching may be disabled in a user setting or may provide a prompt to a user to confirm that the user wants to enter the event in the calendar whose membership is only a partial match to the messaging correspondents.

Therefore, based on the check at block 520 and the selection of the calendar at block 540, the initial calendar for a calendar event can more appropriately align with messaging correspondents.

In other embodiments, the user can select a default calendar for each messaging session in the configuration options for that messaging session. For example, one of the configuration options in an interface similar to that shown in FIG. 8B could allow the user to select a default calendar for that messaging session. Then, the default calendar shown by calendar field 438 will correspond to the default calendar for that messaging session.

Cancelling Appointments

If a natural language processing algorithm detects a user's or other meeting participant's desire to cancel an existing appointment, it may search existing calendars for such appointment and prompt the user to cancel the appointment if a match is detected.

In one embodiment, the accuracy of the algorithm may be improved if a device tracks within the calendar entries the message correspondents that resulted in the calendar entry, and only performs matching within those calendar entries whose messaging correspondents match the existing correspondents.

For example, the device can perform the matching algorithm described with regard to FIG. 5 above, by comparing the messaging correspondents to the members of the shared calendars on the device, and can first perform matching within the respective shared calendars found with this process. In some cases, if no match is found, the process may then move on to other calendars. In other embodiments, the matching may be only performed in the found shared calendars.

Figures 6A, 6B:
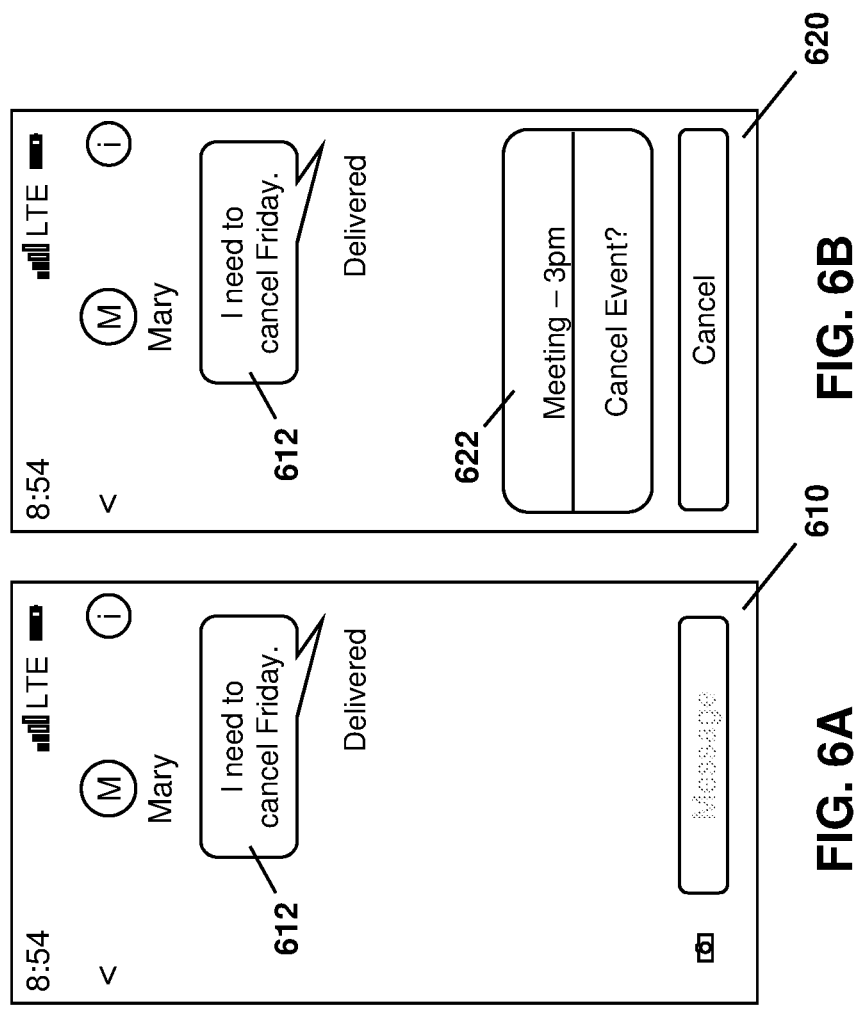
FIG. 6A is a block diagram showing an example window of a messaging application receiving a message to cancel an event.
FIG. 6B is a block diagram showing an example window used for a messaging application in which a potential cancellation of an event has been detected and in which a user is prompted to perform an action.

For example, reference is now made to FIG. 6A. Suppose a user has eight calendar entries for Friday, one of which is named "Meeting" at 3 PM which is part of the calendar "Parents" of FIG. 1B. The other seven events are part of the default calendar named "Work".

In this example, none of the calendar entries were created based on natural language processing detection within the messaging thread.

As seen in window 610 of FIG. 6A, Mary sends a message 612 to Mike saying "I need to cancel Friday". In this case, the device may examine calendar entries for Friday. A device may limit the search to entries within the shared calendar "Parents" since the messaging correspondents match the members of the shared calendar. In other cases, the device may start with the "Parents" calendar and then move on to other calendars.

At FIG. 6B, the device has found a meeting on Friday with both participants of the shared calendar within the shared calendar events and therefore prompts the user, as seen with prompt 622 in window 620, to cancel the meeting at 3 PM.

Figure 7:
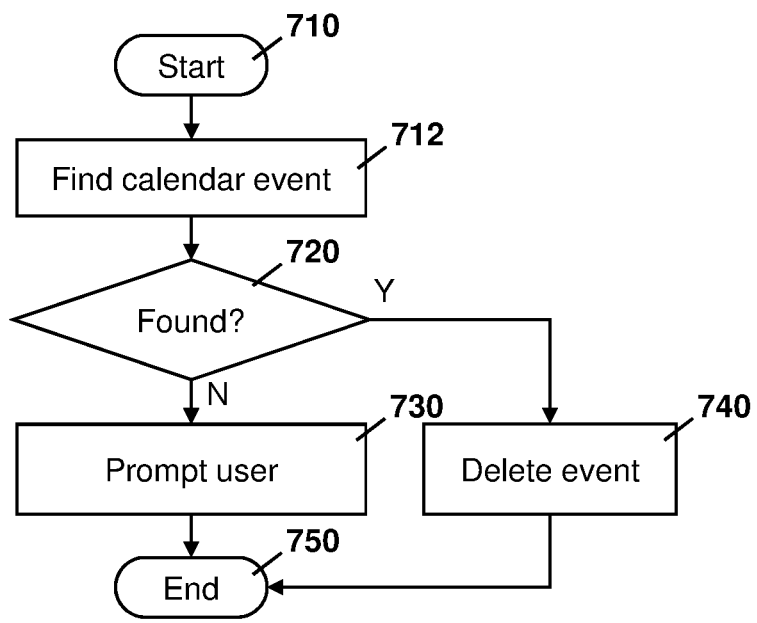
FIG. 7 is a process diagram showing a process for deleting an event from a calendar.

The process to determine the event is, for example, provided in FIG. 7. The process of FIG. 7 starts at block 710 when the natural language processing algorithm detects the attempt to cancel an event.

The process then proceeds to block 712 in which the calendar event is found. As indicated above, the calendar event may be found by searching shared calendars first if the participants in the messaging session are the same as members in a shared calendar. In some cases, the searching may be limited to the shared calendars where a match is found. In other cases, the shared calendar may be the first calendar searched but the process may then proceed to search other calendars such as a default calendar. If there is a specific calendar associated with the message thread, then that specific calendar can be searched first.

Once the calendar is selected, the process may search for events within the selected calendar that match the criteria of the cancellation attempt. In particular, from FIG. 6A the event is on "Friday" and therefore, the search is limited to those events that occur on Friday. Further, the search will look for meeting participants or calendar membership that include both Mike and Mary.

From block 712 the process proceeds to block 720 in which a check is made to determine whether an appropriate event is found. If not, the process may proceed to block 730 and optionally prompt a user to locate the event. The prompting of the user at block 730 is however optional and in some cases if no corresponding event is found then the process may proceed directly from block 720 to block 750 and end.

If the event is found, the process may proceed from block 720 to block 740 in which the event may be deleted. The deletion may be automatic in some cases. In other cases, the deletion may be based on a prompt to a user. In some cases, the prompt may be user configurable and therefore the user may determine whether he or she wants to receive a prompt prior to deleting events.

From block 740 the process proceeds to block 750 and ends.

Synchronizing Alerts

In a further embodiment, many messaging applications have the option to disable or hide alerts for messages received from certain recipients. For example, reference is now made to FIG. 8A. In the embodiment of FIG. 8A, a window 810 is provided on a user interface of an electronic device which shows the details for a communication between various parties. In this case, area 812 shows that the details are being provided and area 820 shows the people involved with the messaging. In this case, the only person involved with the messaging is Mary.

Toggle 830 allows a user to set a preference to hide alerts when messages are received from Mary.

Typically, when a user toggles the toggle 830 then future messages received from Mary will not provide an alert to the user. However, other events within a calendar shared with Mary would still generate alerts.

Therefore, in accordance with one embodiment the present disclosure, when a user toggles the hide alerts field from a message thread, the device may prompt the user as to whether to hide alerts for any matching shared calendars.

Figure 8B:
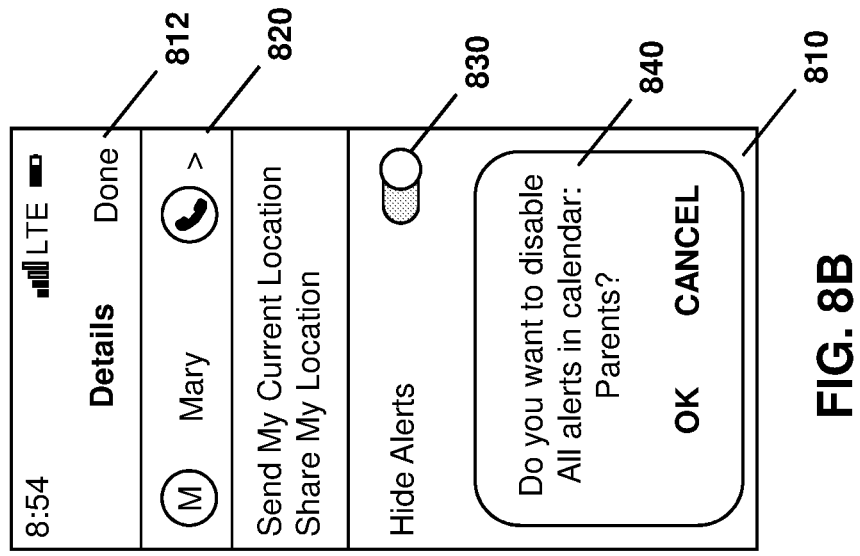
FIG. 8B is a block diagram showing an example window used for a messaging application in which toggling of a hide alerts button results in a user being prompted of whether to perform an action in a shared calendar.
Figure 8A:
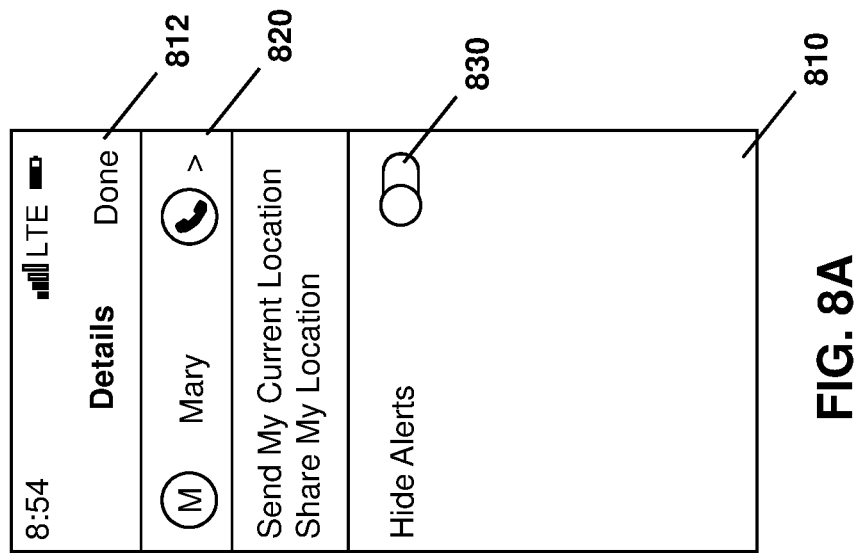
FIG. 8A is a block diagram showing an example window of a messaging application used to hide or enable alerts.

In particular, in the example of FIG. 8B, when a user toggles the toggle 830, a message in area 840 may appear asking whether the user wants to hide all alerts for events within the calendar entitled "Parents".

The determination of a calendar in which to disable alerts may be made in accordance with the embodiment of FIG. 5 above.

Figure 9:
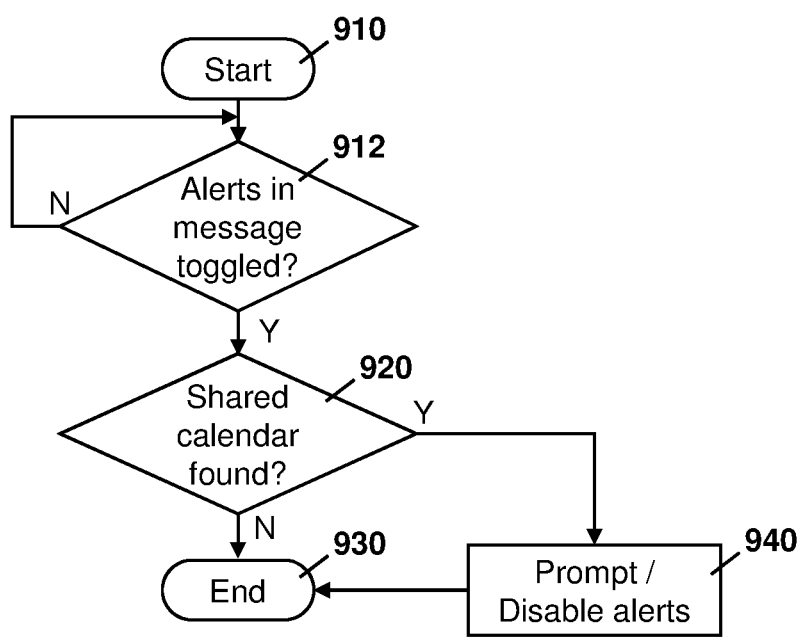
FIG. 9 is a process diagram showing a process for toggling alerts in a shared calendar.

Further, a process is provided in FIG. 9 for enabling or disabling alerts. The process of FIG. 9 starts at block 910 and proceeds to block 912 in which a check is made to determine whether alerts in a message thread have been toggled. As used herein, toggling may be one or both of disabling or enabling the alerts. If not, the process proceeds to block 912 and continues to monitor whether alerts for the message thread have been toggled.

From block 912, if alerts in a message thread are toggled, then the process proceeds to block 920 in which a check is made to determine whether a shared calendar exists between the participants in the message thread or whether the message thread is associated with a specific calendar. For example, if the participants in the message thread are all part of a shared calendar, then the check at block 920 may determine that the shared calendar is potentially affected. In other cases, if the participants in the messaging are a subset of a group which may contain other members, the check at block 920 may also determine that a shared calendar has been found.

If no shared calendar is found at block 920 then the process proceeds to block 930 and ends.

Conversely, if a shared calendar between the messaging correspondents is found at block 920, then the process proceeds to block 940 in which the user may be prompted to enable or disable alerts from all of events in such calendar. In other cases, the enabling or disabling of the alerts in the shared calendar may be automatic. The choice of whether to prompt the user may also be a user configurable setting.

From block 940 the process proceeds to block 930 and ends.

Tentative Events

In some cases, natural language processing algorithms may recognize that an event is planned, but may have difficulty because there is more than one potential appointment in the message. Typically, in current systems, a user is only allowed to create a calendar event for one item and there is no subsequent intelligence.

Figures 10A, 10B:
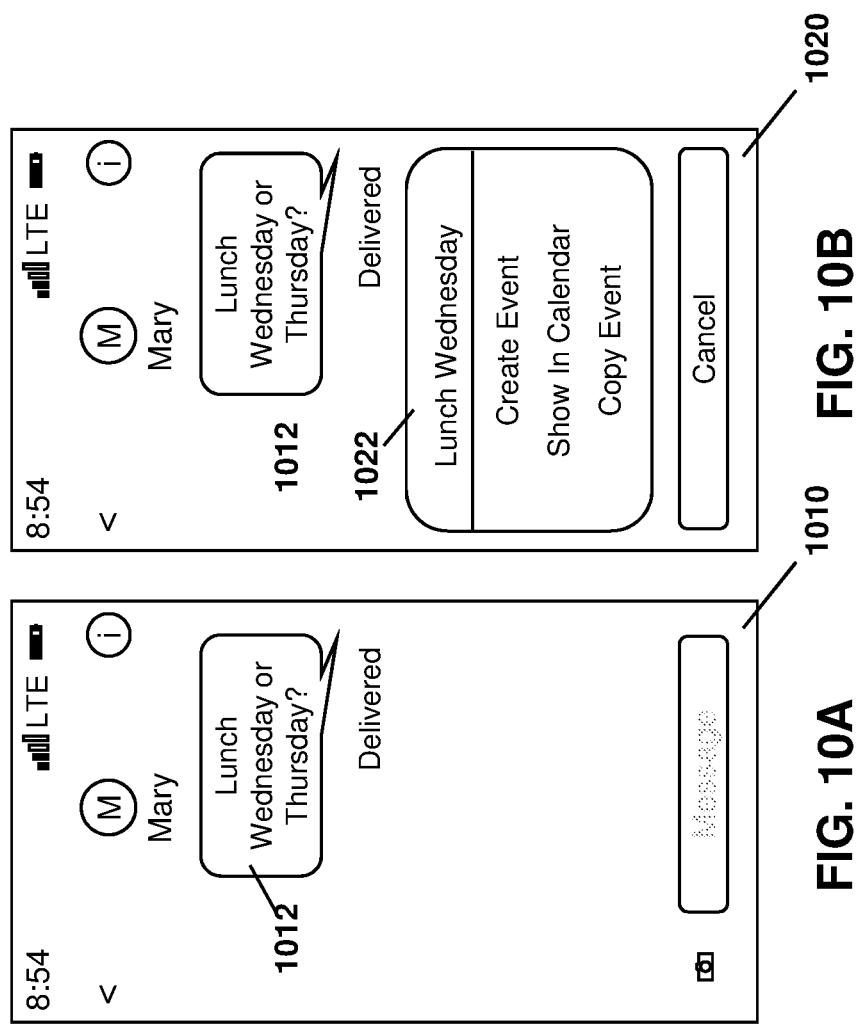
FIG. 10A is a block diagram showing an example window of a messaging application receiving a message having multiple possible event days.
FIG. 10B is a block diagram showing an example window from FIG. 10A in which some of the multiple events are ignored.

In particular, reference is now made to FIG. 10A. In the embodiment of FIG. 10A, Mary sends Mike a request for lunch on Wednesday or Thursday, as seen in area 1012 of window 1010. In current messaging systems, the natural language processing algorithms may recognize there is ambiguity in the message and simply ignore the message. In this case, no calendar prompt may be provided to a user and if a user wants to schedule an appointment, the user will need to do so manually.

Alternatively, in many current systems, the embodiment of FIG. 10B would occur. In this case, the natural language processing algorithm chooses the first time available and prompts the user to create such event at that time. Thus, as seen in area 1022 in window 1020, the electronic device prompts user to create an event on Wednesday, simply ignoring the request for Thursday.

Therefore, in accordance with one embodiment of the present disclosure, upon recognizing more than one potential appointment in a message thread, the messaging application may prompt the user to add appointments to the calendar. In the example of FIG. 10B, the user would be prompted to add calendar entries for both Wednesday lunch and Thursday lunch.

Each of the calendar entries would be designated as "unconfirmed" in some manner. For example, the calendar entries could be marked with a "tentative" flag common in calendar applications. Alternatively, the calendar entries could be marked as "waiting for confirmation" in the title or subject of the meeting.

A natural language processing algorithm may then monitor the message thread for a response from the other party. Thus, for example, if the other party confirms one of the appointments, such as with a message stating "I prefer Thursday", the corresponding appointment may be unflagged and the unconfirmed appointments may be deleted. These events could happen automatically, upon input from a user, or dependent on a setting.

The unflagging could change the "tentative" flag to a "busy" flag. Alternatively, the unflagging could correspond to removing the "waiting for confirmation" from the title or subject.

In one embodiment, if the other party does not confirm one of the appointments, but instead offers an alternate time, then all previous unconfirmed appointments may be deleted and the new appointment may be added to the calendar as an entry and flagged as described above. This could happen automatically, upon input from a user, or dependent upon a setting.

Further, in some cases, the embodiments of FIG. 5 above could be utilized and therefore the events could be added to a shared calendar if the participants in the events, as recognized from the users involved in the message conversation, share a calendar.

Figure 11:
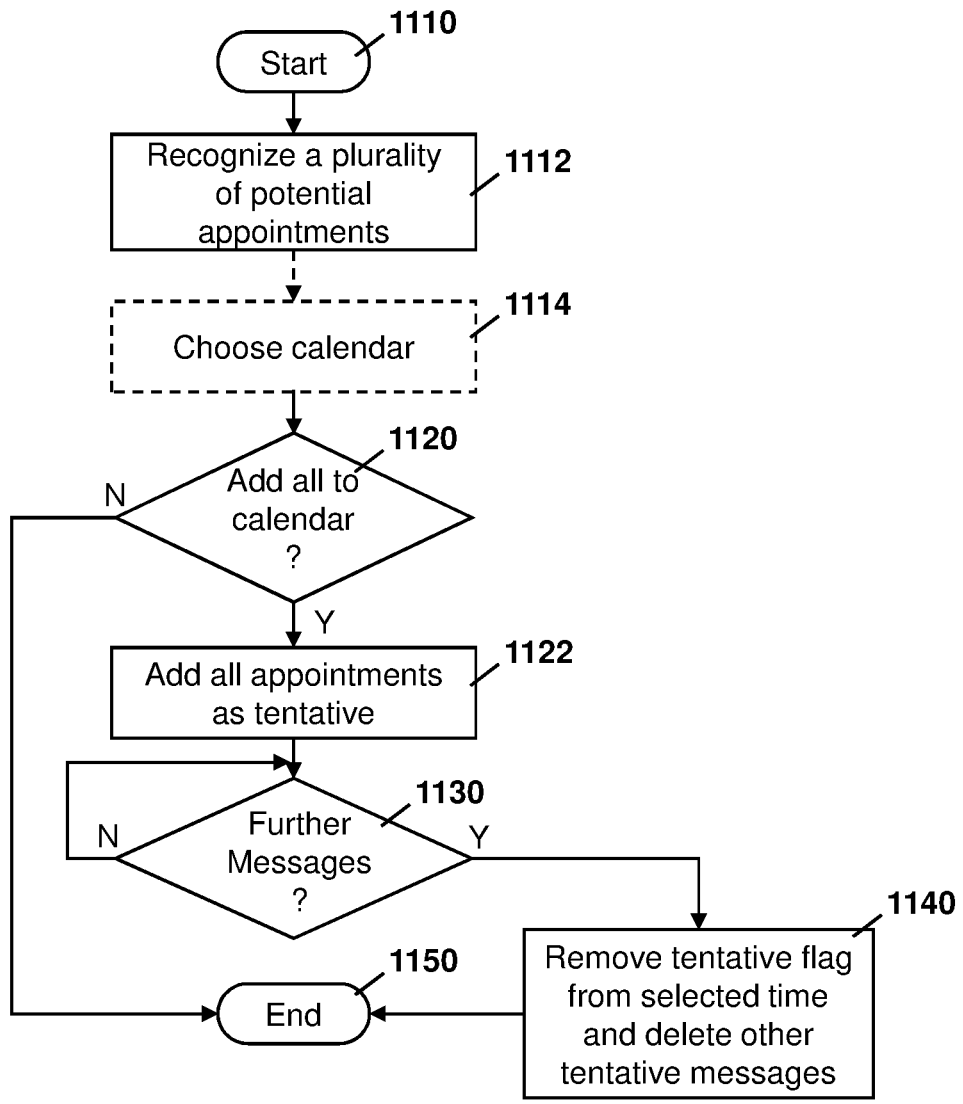
FIG. 11 is a process diagram showing a process for creating and resolving multiple tentative events in a calendar.

Therefore, one example process is shown with regard to FIG. 11. In the embodiment of FIG. 11, a message is received and the process starts at block 1110.

The process then proceeds to block 1112 in which natural language processing algorithms may recognize a plurality of appointments.

In some cases, the process may proceed to block 1114 in which a calendar is chosen based on the parties participating in the messaging. Block 114 is however optional, and in some cases the process may proceed from block 1112 directly to block 1120.

At block 1120, the process checks to see whether the plurality of appointments should be added to the calendar. This may, for example, involve prompting a user whether to add the calendar events. In some cases, the adding of the events may be done based on a setting within the electronic device and may default to yes for adding all of the recognized plurality of appointments.

If the events are not to be added to the calendar, the process proceeds from block 1120 to block 1150 and ends.

If the events are to be added to the calendar, the process proceeds from block 1120 to block 1122 in which the appointments are added to the calendar as tentative appointments.

The process then proceeds to block 1130 in which subsequent messaging is waited for. In particular, the subsequent messaging may be to find which one of the plurality of appointments is confirmed.

Once a confirmation of the appointment is made, as determined at block 1130, the process proceeds to block 1140. At block 1140, the tentative flag is removed from the confirmed appointments and the other tentative events are deleted from the calendar.

As it will be appreciated by those in the art, the process at block 1130 and block 1140 may be incremental. Thus, for example, if a message asks for a meeting "next week", tentative events may be scheduled for the entire following week. If the next message states "I can meet any time next week except Thursday and Friday", the tentative meetings for Thursday and Friday may be removed, but the tentative meetings from Monday, Tuesday or Wednesday remain. In this case, a subsequent response may confirm a date and time, at which point the other tentative meetings are removed.

From block 1140, the process proceeds to block 1150 and ends.

In other cases, rather than a plurality of potential meetings, one a meeting may be proposed for an indefinite time period. For example, a meeting request may be "Can you meet anytime tomorrow?". In this case, the potential meeting time is indefinite.

As with the embodiment of FIG. 11, the messaging application may prompt the user whether to add the appointment to the calendar. In this case, the calendar entry may be designated as unconfirmed in some manner. For example, the calendar entry could be marked with a "tentative" flag. Alternatively, the calendar entry could be marked as "waiting for confirmation" in the subject line or title.

The natural language processing algorithm may then monitor the messaging thread for a response from the other party. If the other party confirms a specific time, then the calendar entry is edited based on the response and the flag is updated as described with regard to the embodiment of FIG. 11. Thus, for example, if a response is "how about 9 AM to 10 AM Central", then the calendar entry is reduced from all day tomorrow to 9 AM to 10 AM Central tomorrow.

If the other party does not confirm a subset of the tentative time, but instead offers an alternate time, then the previous appointment may be deleted and the new event at the new time is added as a calendar entry. This could happen automatically, after input from the user, or dependent upon a setting.

Figure 12:
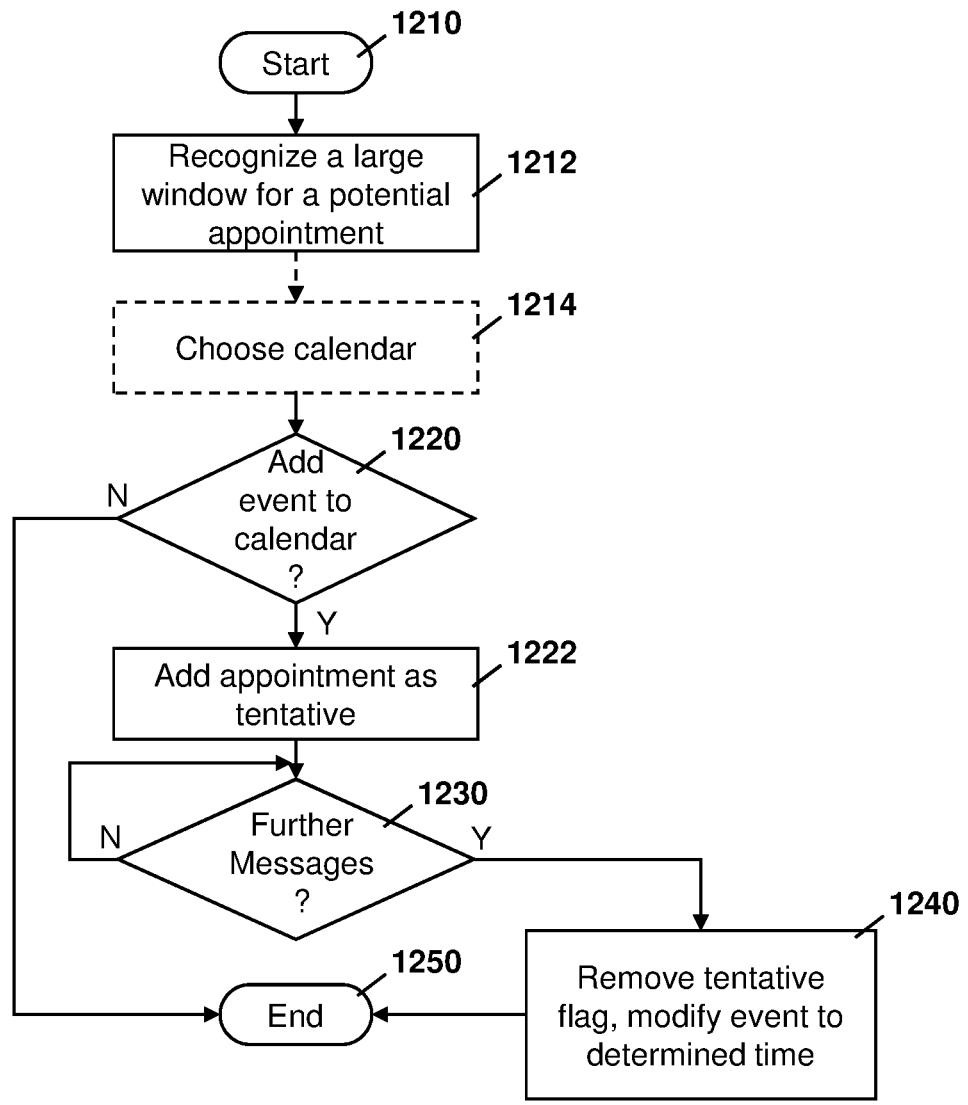
FIG. 12 is a process diagram showing a process for creating and resolving tentative events having uncertain start and end times in a calendar.

Therefore, reference is now made to FIG. 12. A message is received and the process started at block 1210. The process then proceeds to block 1212 in which the natural language processing may recognize a large window for a potential appointment.

The process may then proceed, in some cases, to block 1214 in which a calendar is chosen for the event. The choice of the calendar may be done, for example, based on the embodiment of FIG. 5 above. However, in some cases, the choice of the calendar is optional. In this case, the process would proceed directly from block 1212 to block 1220.

At block 1220 a decision is made on whether to add the event to the calendar. The decision may be based on a prompt to a user or may be based on criteria stored within the electronic device. If the event is not to be added to the calendar then the process proceeds to block 1250 and ends.

Conversely, if the event is to be added to the calendar, then the process proceeds from block 1220 to block 1222 in which the appointment is added with a "tentative" flag. In this case, if the message was "do you have time to meet tomorrow", then a tentative appointment may be created in a user's calendar for the entire next day.

The process then continues to monitor the messaging thread to determine whether further clarification on the meeting time is provided. This is done, for example, at block 1230 in the embodiment of FIG. 12.

Once further clarification is provided, the process proceeds to block 1240 in which the tentative flag is removed from the appointment that was added to the calendar at block 1222, and the event is modified to the clarified time period.

The process of blocks 1230 and 1240 may be iterative. In this case, a user may narrow down the time slightly which may lead to the appointment being narrowed slightly but still longer than necessary for the actual appointment. In this case, based on the messaging thread, the appointment may be modified over several messages. For example, a follow-up message may narrow an appointment from "anytime tomorrow" to "I can meet anytime before lunch". In this case, the appointment may remain tentative, but the time duration could be narrowed to the morning of the next day. The natural language processing algorithms make then continue to monitor the message thread to identify a particular time for the meeting.

From block 1240 the process proceeds to block 1250 and ends.

Further, in some cases, the solutions of FIGS. 11 and 12 above could be used for a single appointment. Thus, for example, a single appointment can be flagged as unconfirmed until the natural language processing algorithm detects a positive response from the other messaging party. In this case, once the response is received from the other messaging party, the "tentative" flag may be removed from the event or meeting and the meeting could be considered to be confirmed.

Further, in the embodiments of FIG. 11 or 12, if a certain amount of time has elapsed at blocks 1130 or 1230 waiting for subsequent messages and no subsequent messages are received, then the messaging application could remind a user that there are unconfirmed appointments and prompt the user whether to send a reminder to the other party or to confirm one of the unconfirmed appointments and delete the remaining appointments. The amount of time that has elapsed before the reminder may be fixed, may be dependent on a time until the appointment date, or may be user configurable, among other options.

The modules and user equipments and devices performing the methods described above may be any electronic device or network node. Such electronic device or network node may include any type of computing device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 13:
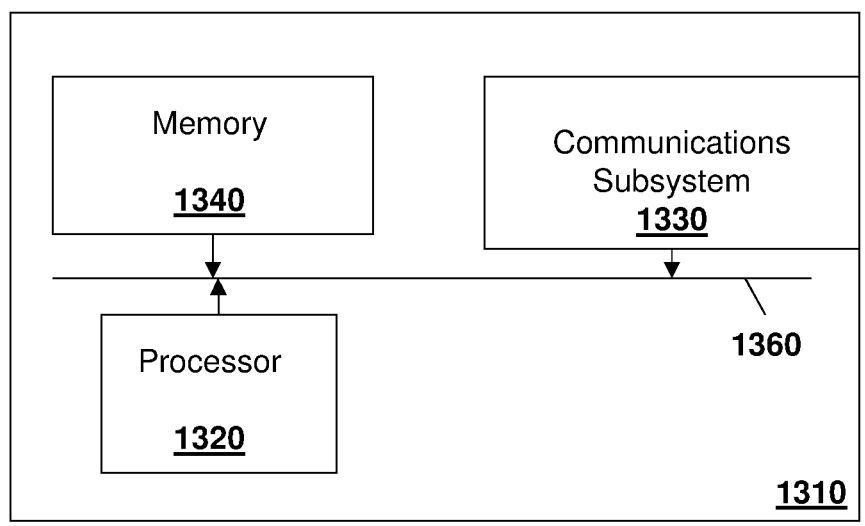
FIG. 13 is a block diagram of a simplified electronic device capable of being used with the methods and systems herein according to one embodiment.

One simplified diagram of an electronic device is shown with regard to FIG. 13.

In FIG. 13, device 1310 includes a processor 1320 and a communications subsystem 1330, where the processor 1320 and communications subsystem 1330 cooperate to perform the methods of the embodiments described above. Communications subsystem 1320 may, in some embodiments, comprise multiple subsystems, for example for different radio technologies.

Processor 1320 is configured to execute programmable logic, which may be stored, along with data, on device 1310, and shown in the example of FIG. 13 as memory 1340. Memory 1340 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1340, device 1310 may access data or programmable logic from an external storage medium, for example through communications subsystem 1330.

Communications subsystem 1330 allows device 1310 to communicate with other devices or network elements and may vary based on the type of communication being performed. Further, communications subsystem 1330 may comprise a plurality of communications technologies, including any wired or wireless communications technology.

Communications between the various elements of device 1310 may be through an internal bus 1360 in one embodiment. However, other forms of communication are possible.

Further, if the electronic device is a user equipment, one example user equipment is described below with regard to FIG. 14.

User equipment 1400 may comprise a two-way wireless communication device having voice or data communication capabilities or both. User equipment 1400 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 1400 is enabled for two-way communication, it may incorporate a communication subsystem 1411, including a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the user equipment is intended to operate.

Network access requirements will also vary depending upon the type of network 1419. In some networks, network access is associated with a subscriber or user of the user equipment 1400. A user equipment may require an embedded or a removable user identity module (RUIM) or a subscriber identity module (SIM) card or a UMTS SIM (USIM) in order to operate on a network. The USIM/SIM/RUIM interface 1444 is normally similar to a card-slot into which a USIM/SIM/RUIM card can be inserted and ejected. The USIM/SIM/RUIM card can have memory and hold many key configurations 1451, and other information 1453 such as identification, and subscriber related information.

When required network registration or activation procedures have been completed, user equipment 1400 may send and receive communication signals over the network 1419. As illustrated in FIG. 14, network 1419 can include multiple base stations communicating with the mobile device.

Signals received by antenna 1416 through communication network 1419 are input to receiver 1412, which may perform such common receiver functions as signal amplification, frequency down conversion, filtering, channel selection and the like. Analog to digital (A/D) conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog (D/A) conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

User equipment 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem or DSRC subsystem, and any other device subsystems generally designated as 1442. Serial port 1430 could include a USB port, On-Board Diagnostics (OBD) port or other port known to those in the art.

Figure 14:
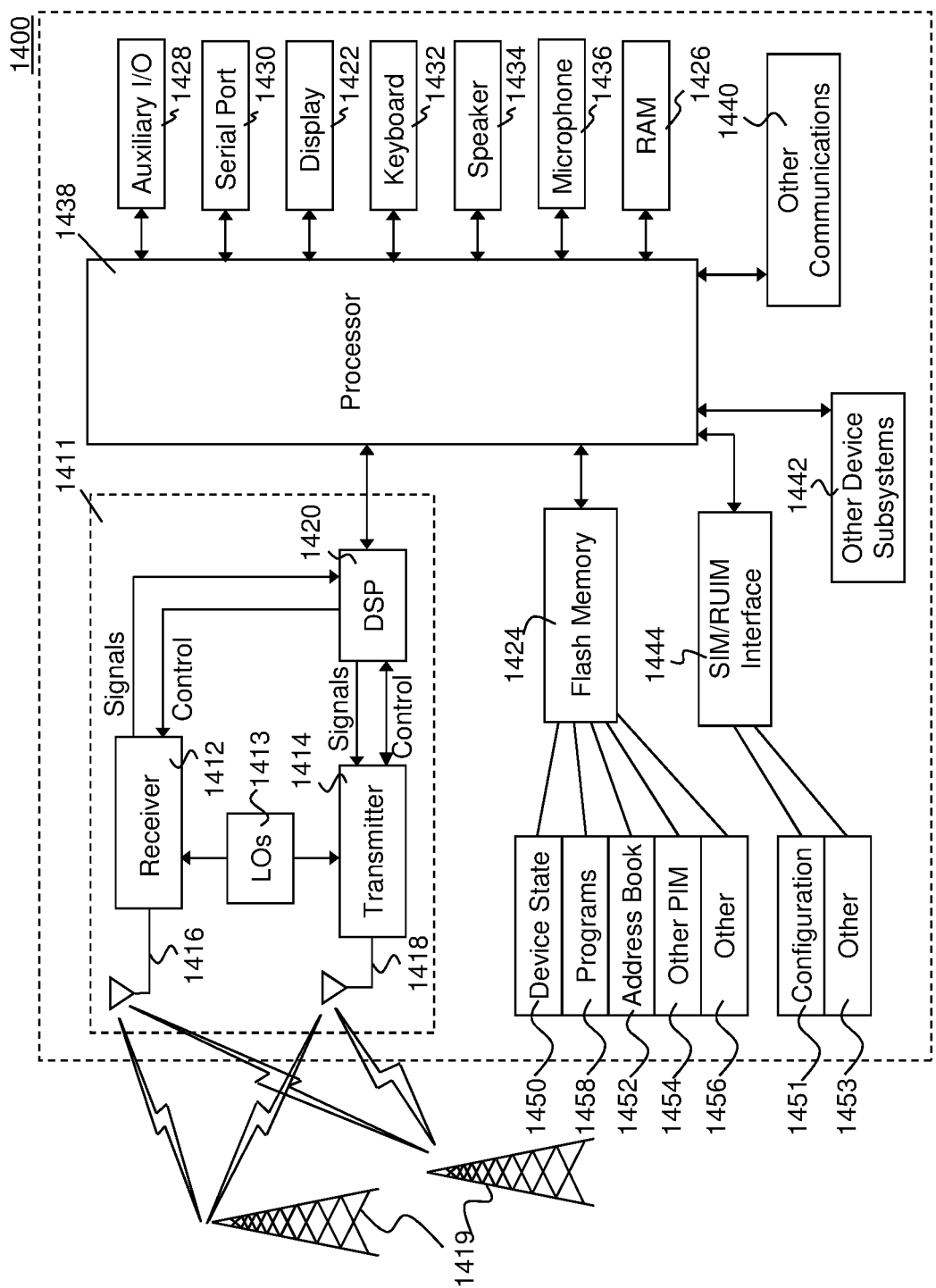
FIG. 14 is a block diagram of a mobile device according to one embodiment.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the processor 1438 may be stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Processor 1438, in addition to its operating system functions, may enable execution of software applications on the user equipment. A predetermined set of applications that control basic operations, including potentially data and voice communication applications for example, will normally be installed on user equipment 1400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, messaging applications, social media applications, games, among others, may also be loaded onto the user equipment 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the processor 1438. Such flexibility in application installation increases the functionality of the device and may provide enhanced on-device functions, communication-related functions, or both.

In a data communication mode, a received signal such as a text message or web page download will be processed by the communication subsystem 1411 and input to the processor 1438, which may further process the received signal for output to the display 1422, or alternatively to an auxiliary I/O device 1428.

A user of user equipment 1400 may also compose data items such as messages for example, using the keyboard 1432, which may be a complete alphanumeric keyboard or telephone-type keypad, either physical or virtual, among others, in conjunction with the display 1422 and possibly an auxiliary I/O device 1428. Such composed items may then be transmitted over a communication network through the communication subsystem 1411.

Where voice communications are provided, overall operation of user equipment 1400 is similar, except that received signals may typically be output to a speaker 1434 and signals for transmission may be generated by a microphone 1436. Alternative voice or audio I/O subsystems, such as a voice message recording subsystem, may also be implemented on user equipment 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 20 may be implemented in a user equipment for which synchronization with a user's desktop computer (not shown) may be desirable, but is an optional device component. Such a port 1430 may enable a user to set preferences through an external device or software application and may extend the capabilities of user equipment 1400 by providing for information or software downloads to user equipment 1400 other than through a wireless communication network. As will be appreciated by those skilled in the art, serial port 1430 can further be used to connect the user equipment to a computer to act as a modem or for charging a battery on the user equipment.

Other communications subsystems 1440, such as a short-range communications subsystem, is a further component which may provide for communication between user equipment 1400 and different systems or devices, which need not necessarily be similar devices. For example, the subsystem 1440 may include an infrared device and associated circuits and components or a Bluetooth™ or Bluetooth™ Low Energy communication module to provide for communication with similarly enabled systems and devices. Subsystem 1440 may further include non-cellular communications such as Wi-Fi or WiMAX, or near field communications, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an electronic device, the method comprising:
    receiving an instant message via an instant messaging application at the electronic device via a communications subsystem;
    processing the received instant message to find a potential calendar event;
    determining a list of correspondents associated with the received instant message, the list of correspondents including at least a sender of the received instant message and a recipient of the received instant message;
    determining a plurality of shared calendars accessible by the electronic device via a calendar application, the calendar application distinct from the instant messaging application, each shared calendar of the plurality of shared calendars comprising a set of time slots which are viewable and editable by each member of each shared calendar;

selecting a shared calendar from the plurality of shared calendars such that each correspondent in the list of correspondents are members of the shared calendar; and populating a calendar input field with an identifier of the shared calendar.

2. The method of claim 1, wherein selecting the shared calendar from the plurality of shared calendars further comprises providing a choice of at least one shared calendar on a user interface.

3. The method of claim 1, wherein populating the calendar input field further comprises providing a prompt on a user interface to confirm whether the potential calendar event should be added to the shared calendar.

4. The method of claim 1, further comprising:
receiving a second instant message via the instant messaging application at the electronic device via the communications subsystem;
processing the second instant message to find a potential cancellation of an event;
determining a second shared calendar from the plurality of shared calendars via the calendar application based on correspondents in the second instant message and membership in the second shared calendar;
searching the second shared calendar for a calendar entry corresponding to the event; and
deleting the event.

5. The method of claim 1, further comprising:
receiving an input at the electronic device to toggle alerts for a message thread associated with the received instant message;
finding a third shared calendar of the plurality of shared calendars accessible by the electronic device via the calendar application, the third shared calendar having the same membership as correspondents of the message thread; and
changing an alert status for the third shared calendar based on the input.

6. The method of claim 1, wherein the received instant message comprises a plurality of potential dates for the potential calendar event, the method further comprising:
creating a plurality of events in the shared calendar;
flagging each of the plurality of events as tentative using a tentative flag; and
removing the tentative flag or deleting at least one of the plurality of events upon receiving further instant messages about the potential calendar event.

7. The method of claim 1, wherein the received instant message comprises an indeterminate time for the potential calendar event, the method further comprising:
creating an indeterminate event in the shared calendar;
flagging the indeterminate event as tentative using a tentative flag; and
removing the tentative flag and updating a time for the indeterminate event upon receiving further instant messages about the potential calendar event.

8. The method of claim 6, further comprising providing a reminder if no further instant messages are received within a determined time period.

9. An electronic device comprising:
a communications subsystem; and
a processor coupled to the communications subsystem, wherein the processor is configured to:
receive, via the communications subsystem, an instant message using an instant messaging application;
process the received instant message to find a potential calendar event;
determine a list of correspondents associated with the received instant message, the list of correspondents including at least a sender of the received instant message and a recipient of the received instant message;
determine a plurality of shared calendars accessible by the electronic device via a calendar application, the calendar application distinct from the instant messaging application, each shared calendar of the plurality of shared calendars comprising a set of time slots which are viewable and editable by each member of each shared calendar;
select a shared calendar from the plurality of shared calendars such that each correspondent in the list of correspondents are members of the shared calendar; and
populate a calendar input field with an identifier of the shared calendar.

10. The electronic device of claim 9, wherein the processor is further configured to select the shared calendar from the plurality of shared calendars by providing a choice of at least one shared calendar on a user interface.

11. The electronic device of claim 9, wherein the processor is further configured to provide a prompt on a user interface to confirm whether the potential calendar event should be added to the shared calendar.

12. The electronic device of claim 9, wherein the processor is further configured to:
receive, via the communications subsystem, a second instant message using the instant messaging application;
process the second instant message to find a potential cancellation of an event;
determine a second shared calendar from the plurality of shared calendars via the calendar application based on correspondents in the second instant message and membership in the second shared calendar;
search the second shared calendar for a calendar entry corresponding to the event; and
delete the event.

13. The electronic device of claim 9, wherein the processor is further configured to:
receive an input at the electronic device to toggle alerts for a message thread associated with the received instant message;
find a third shared calendar of the plurality of shared calendars accessible by the electronic device via the calendar application, the third shared calendar having the same membership as correspondents of the message thread; and
change an alert status for the third shared calendar based on the input.

14. The electronic device of claim 9, wherein the received instant message comprises a plurality of potential dates for the potential calendar event, the processor being further configured to:
create a plurality of events in the shared calendar;
flag each of the plurality of events as tentative using a tentative flag; and
remove the tentative flag or delete at least one of the plurality of events upon receiving further instant messages about the potential calendar event.

15. The electronic device of claim 9, wherein the received instant message comprises an indeterminate time for the potential calendar event, the processor being further configured to:
create an indeterminate event in the shared calendar;

flag the indeterminate event as tentative using a tentative flag; and remove the tentative flag and updating a time for the indeterminate event upon receiving further instant messages about the potential calendar event.

16. The electronic device of claim 14, wherein the processor is further configured to provide a reminder if no further instant messages are received within a determined time period.

17. A non-transitory computer readable medium for storing instruction code which, when executed by a processor of an electronic device causes the electronic device to:

receive, via a communications subsystem, an instant message using an instant messaging application;

process the received instant message to find a potential calendar event;

determine a list of correspondents associated with the received instant message, the list of correspondents including at least a sender of the received instant message and a recipient of the received instant message;

determine a plurality of shared calendars accessible by the electronic device via a calendar application, the calendar application distinct from the instant messaging application, each shared calendar of the plurality of shared calendars comprising a set of time slots which are viewable and editable by each member of each shared calendar;

select a shared calendar from the plurality of shared calendars such that each correspondent in the list of correspondents are members of the shared calendar; and populate a calendar input field with an identifier of the shared calendar.

* * * * *